(12) United States Patent
Robinson et al.

(10) Patent No.: US 9,794,483 B1
(45) Date of Patent: Oct. 17, 2017

(54) VIDEO GEOLOCATION

(71) Applicant: Raytheon Company, Waltham, MA (US)

(72) Inventors: Ian S. Robinson, Redondo Beach, CA (US); John D. Bloomer, Redondo Beach, CA (US); Mark T. Busch, Pls Vrds Pns, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/243,216

(22) Filed: Aug. 22, 2016

(51) Int. Cl.
*H04N 5/232* (2006.01)
*H04N 5/228* (2006.01)

(52) U.S. Cl.
CPC ......... *H04N 5/23248* (2013.01); *H04N 5/228* (2013.01); *H04N 5/23267* (2013.01); *H04N 5/23287* (2013.01); *G06T 2207/10032* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 6,422,508 B1 | 7/2002 | Barnes | |
| 7,548,659 B2 | 6/2009 | Ofek et al. | |
| 7,932,925 B2 | 4/2011 | Inbar et al. | |
| 8,400,619 B1* | 3/2013 | Bachrach | G01C 1/04 356/4.01 |
| 8,861,947 B2 | 10/2014 | Webb et al. | |
| 9,294,755 B2* | 3/2016 | Robinson | H04N 13/0018 |
| 2007/0132856 A1* | 6/2007 | Saito | H04N 5/23248 348/208.99 |
| 2008/0158679 A1 | 7/2008 | Luty et al. | |
| 2008/0273751 A1* | 11/2008 | Yuan | G06K 9/32 382/103 |
| 2010/0265364 A1 | 10/2010 | Robinson et al. | |
| 2012/0019660 A1* | 1/2012 | Golan | H04N 5/232 348/144 |

(Continued)

OTHER PUBLICATIONS

International Search Report and Written Opinion from related PCT Application No. PCT/US2017/022136 dated Jun. 2, 2017.

*Primary Examiner* — Shahbaz Nazrul
(74) *Attorney, Agent, or Firm* — Burns & Levinson LLP; Joseph M. Maraia

(57) ABSTRACT

Systems and methods for identifying root causes for and/or correcting pointing error in moving platform imaging. Scene frames captured by a sensor (e.g., a focal plane array, etc.) are digitally transformed to compensate for relative motion between the scene and platform, then motion residuals are computed based on inter-frame scene gradients, and image eigenfunctions are fit to the motion residuals to compute coefficients that may be used to efficiently correct future image acquisition, determine root cause(s) of pointing (e.g., sensor pointing error, scene mean altitude, platform altitude, etc.) errors, and further digitally correct the captured images. Comparisons may be made to a database of residual transformation coefficients based on known or expected relative motion of the platform to the scene and a known or expected pointing angle. Truly moving targets may be identified, removed and re-added after image digital transformation processing.

20 Claims, 26 Drawing Sheets

(56) References Cited

U.S. PATENT DOCUMENTS

| | | | | |
|---|---|---|---|---|
| 2012/0098933 A1* | 4/2012 | Robinson | ........... | H04N 13/0018 |
| | | | | 348/46 |
| 2012/0307901 A1* | 12/2012 | Robinson | ............. | H04N 19/139 |
| | | | | 375/240.16 |
| 2013/0216144 A1* | 8/2013 | Robinson | .............. | G06T 7/2006 |
| | | | | 382/233 |

* cited by examiner

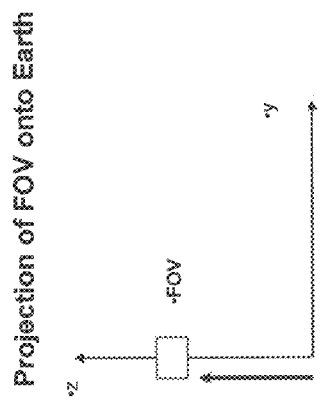
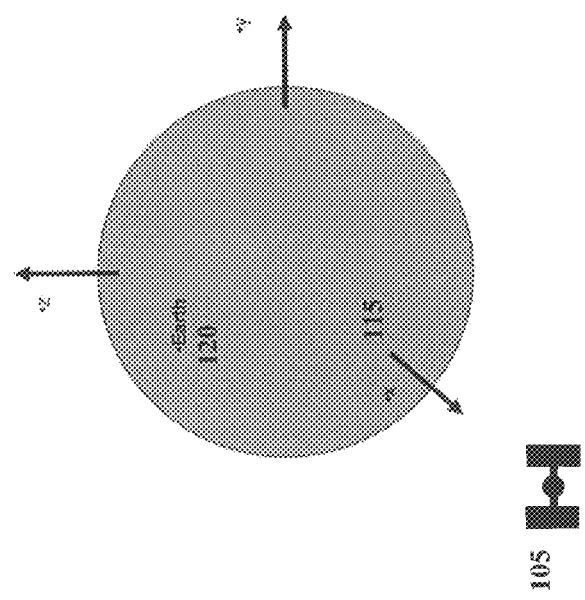
FIG. 3C

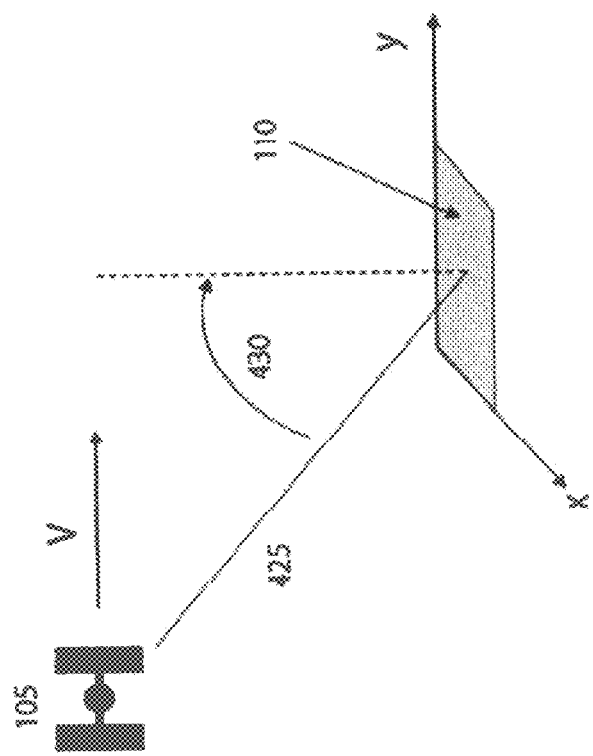
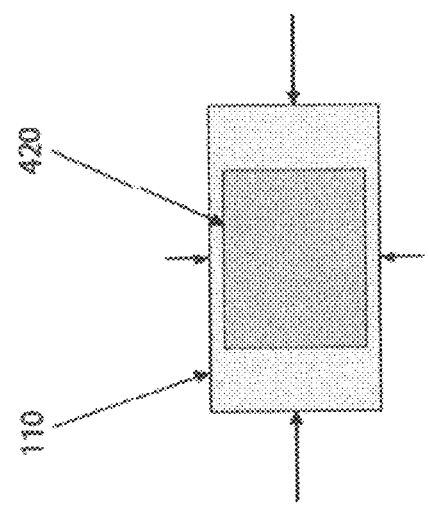
FIG. 4A
FIG. 4B

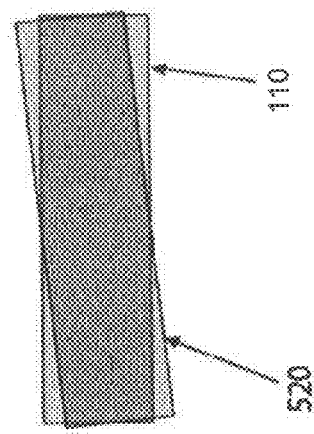
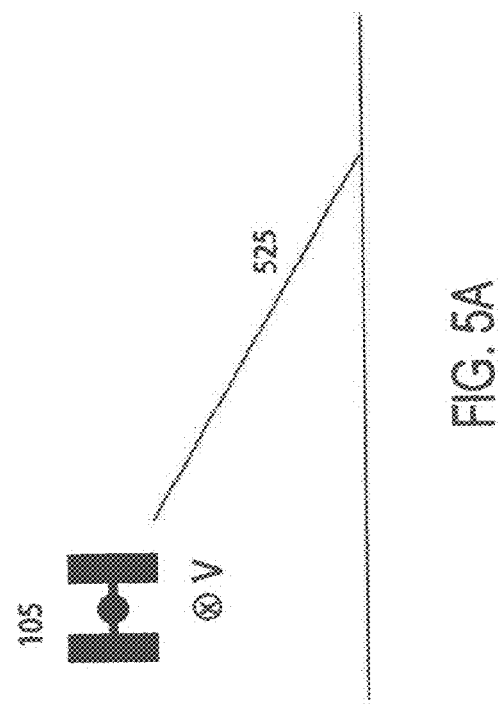
FIG. 5B
FIG. 5A

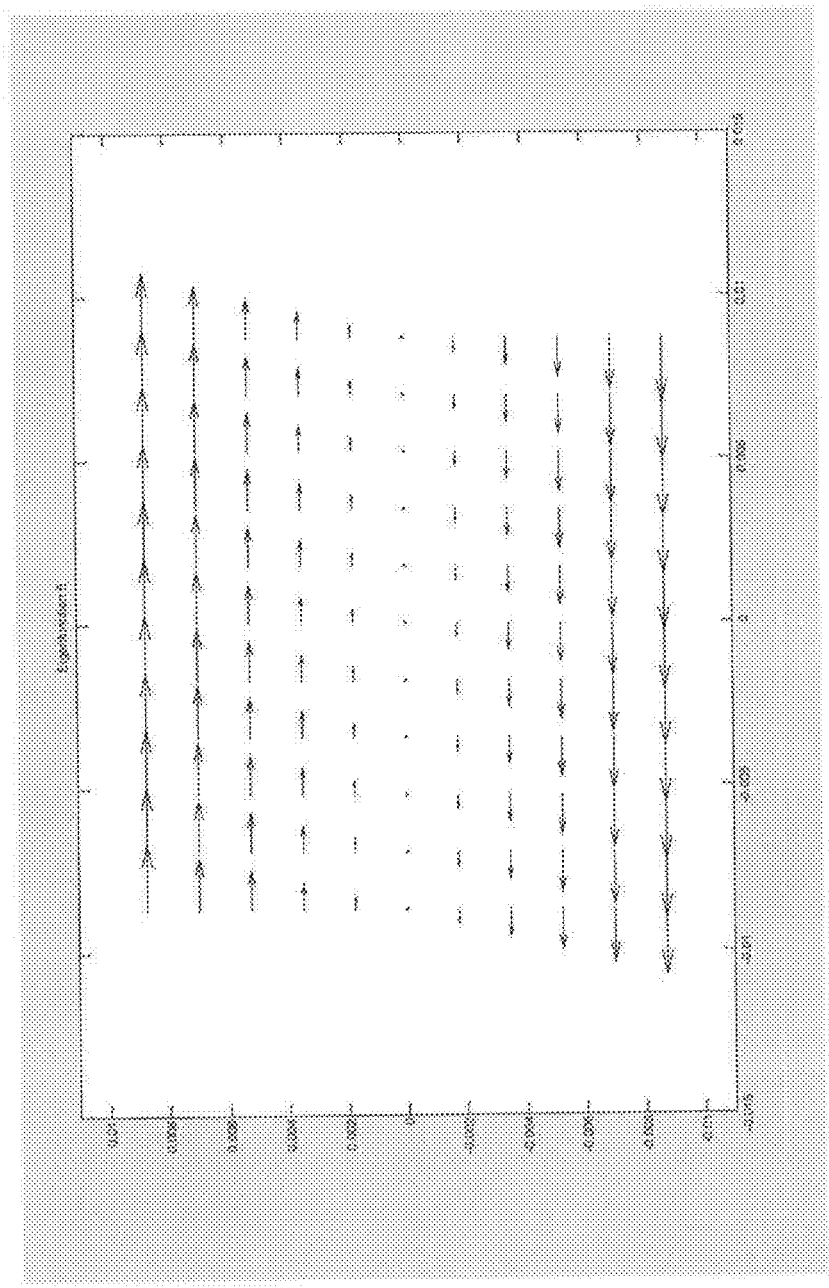

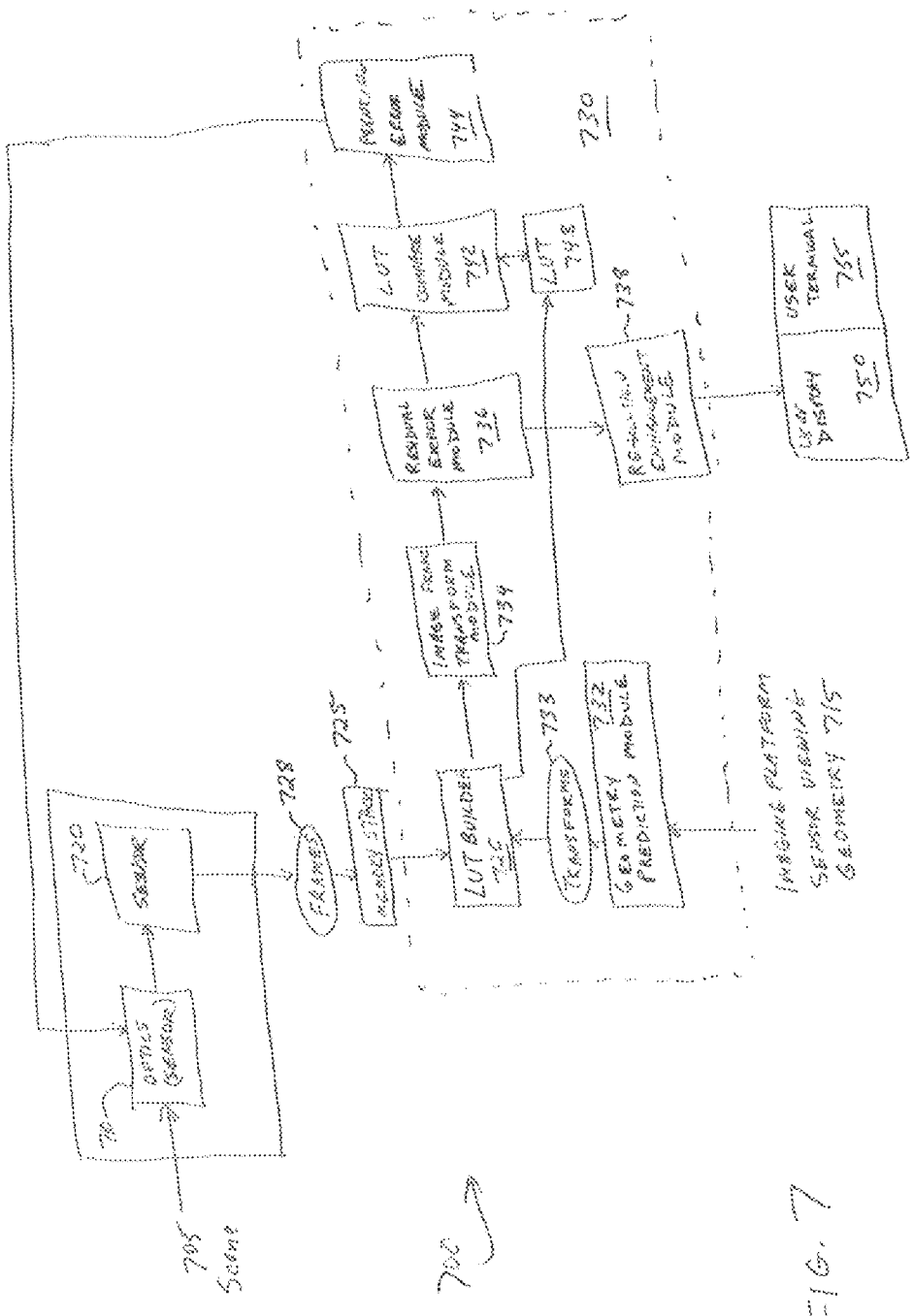

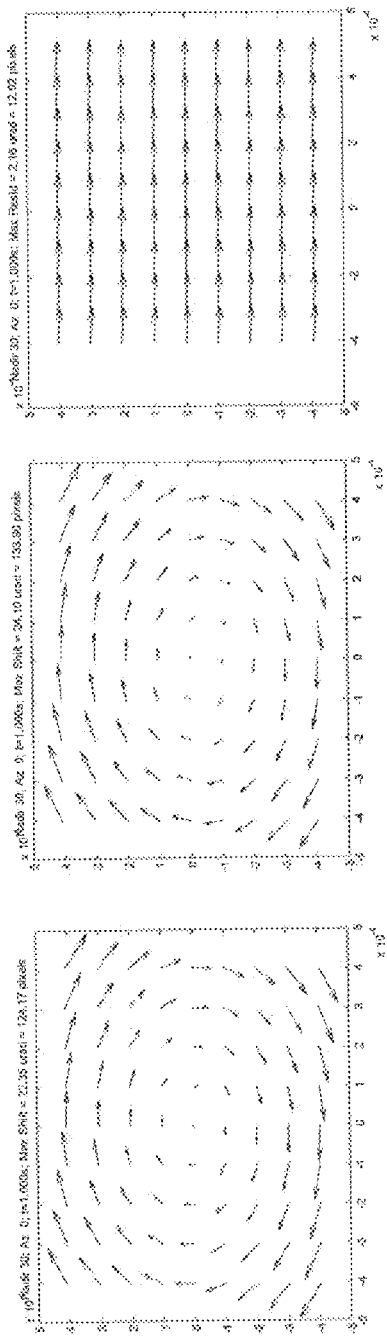

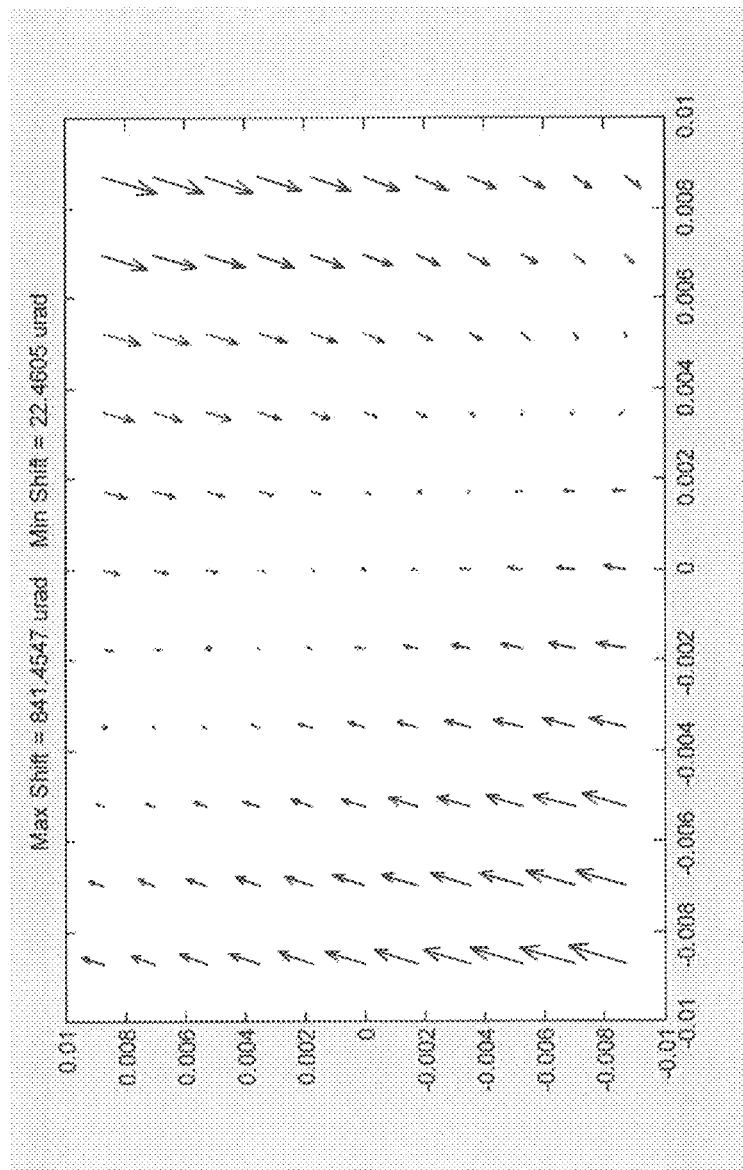

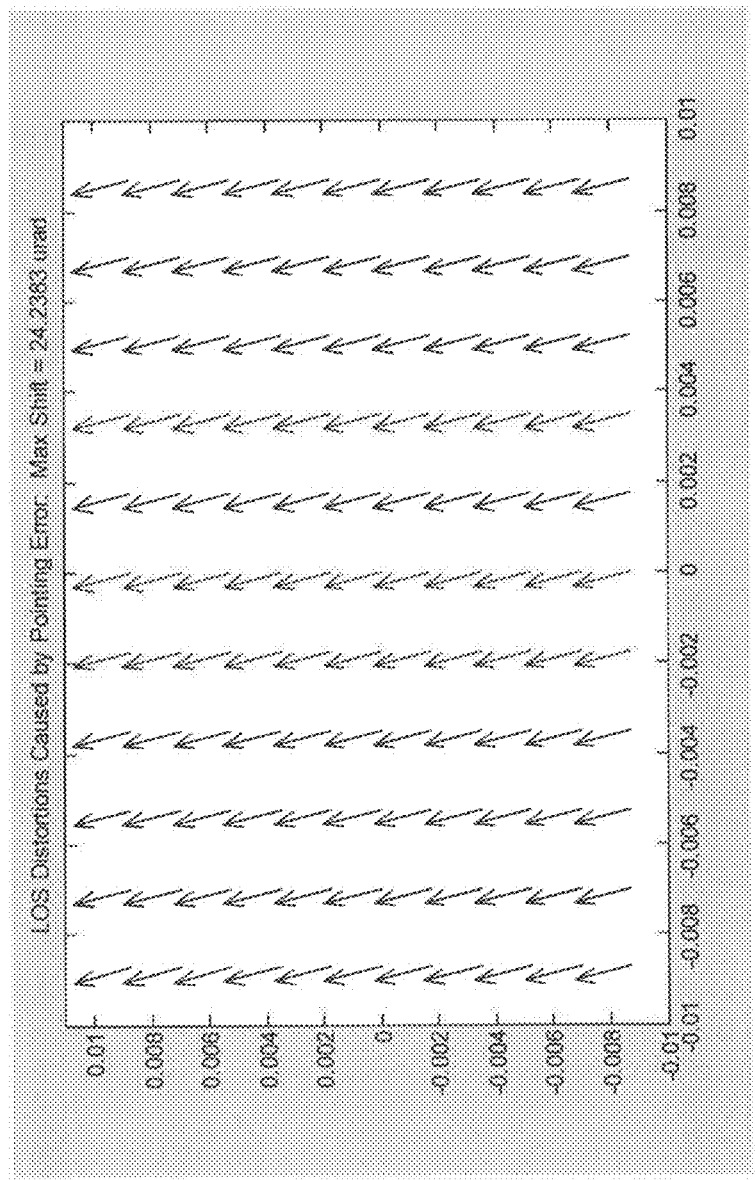

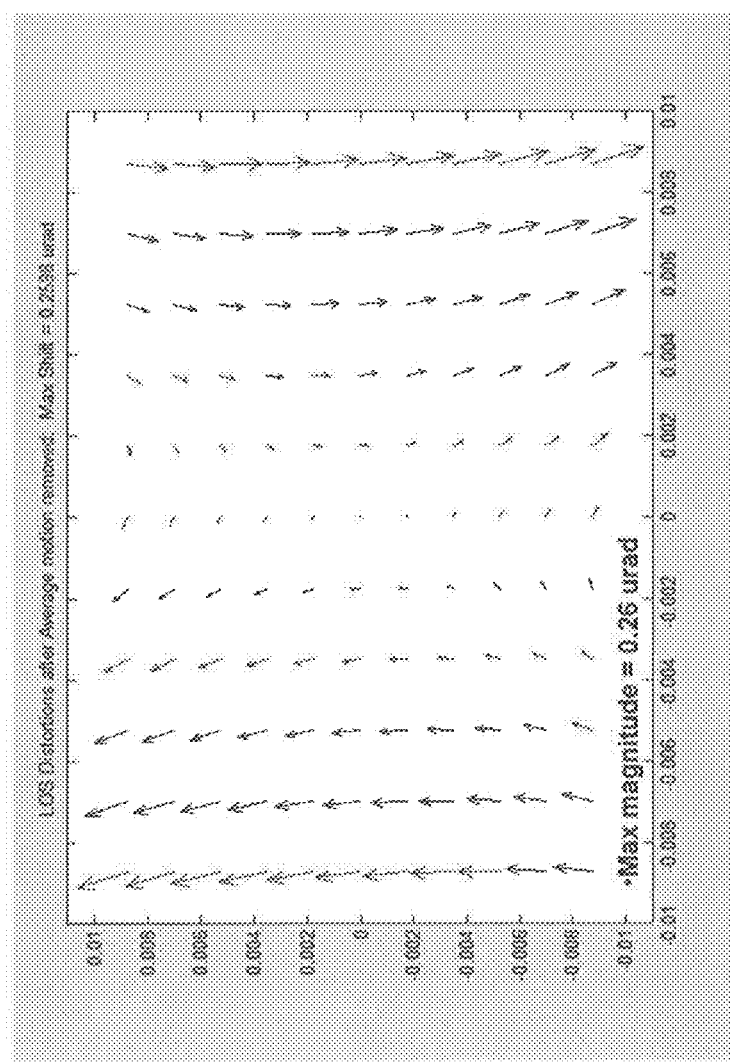

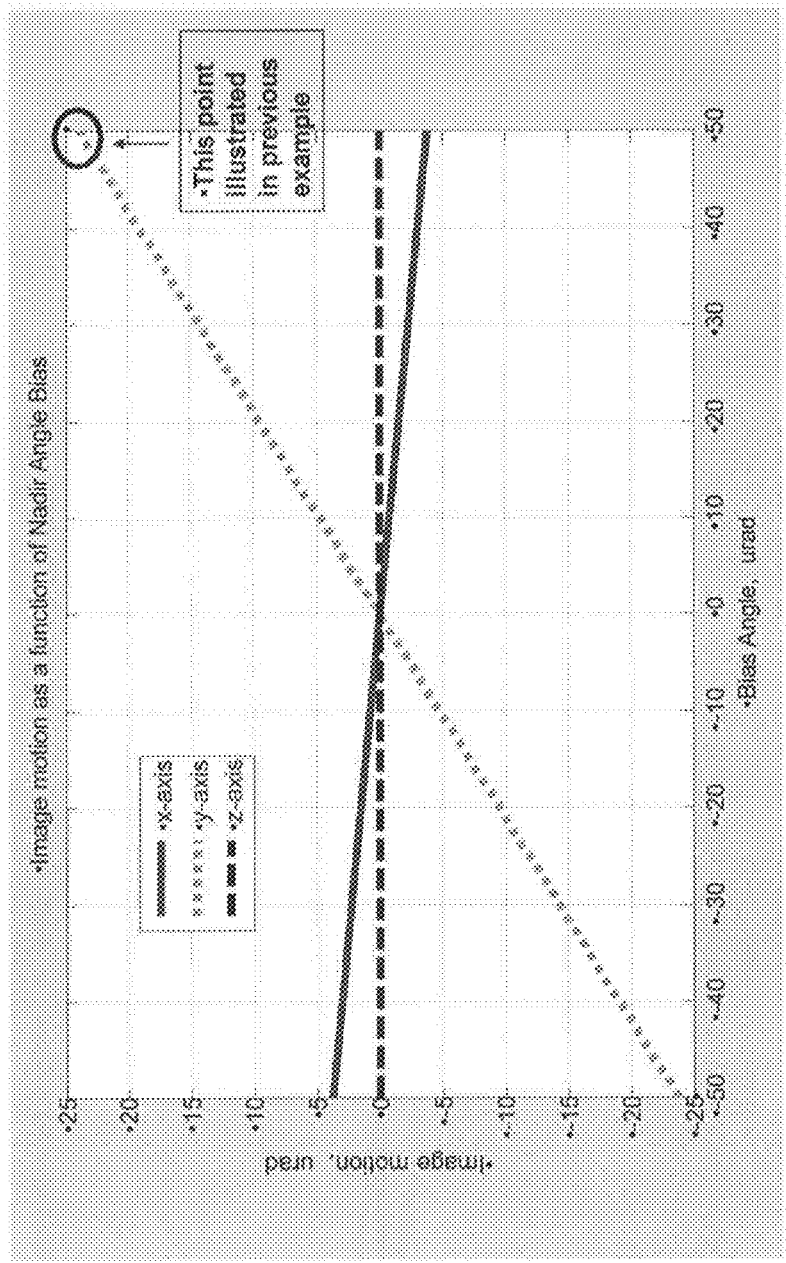

VIDEO GEOLOCATION

BACKGROUND

This application generally relates to image processing, and more particularly, identifying and correcting errors in pointing solutions for persistent observation sensors.

There is a desire to collect persistent video (i.e., multiple image sequences) of a target from overhead platform-based (e.g., airborne or space-based) sensors that can easily be viewed, and/or interpreted, via displays. This may be especially important for military personnel and/or for other persons, using portable devices that may have limited processing capabilities. Conventional persistent video sensors generally stay fixed to (or focus on) a single point, for instance, on the ground, while the overhead platform is in motion.

The motion of the platform, however, causes changes in scale, perspective (e.g. parallax), rotation, and/or other changes in viewing geometry. These changes can complicate or prevent human and/or machine interpretation of targets, features, and threats. Conventional persistent video relies on human interpretation to ignore changes in the measured scene that result from platform motion and/or imperfect sensor staring.

Prior approaches that attempt to correct for errors in pointing solutions have included very computationally intensive and laborious techniques for iteratively determining platform location and sensor boresight pointing. U.S. Pat. No. 8,471,915, issued Jun. 25, 2013, entitled "Self-Correcting Adaptive Long-Stare Electro-Optical System", and herein incorporated by reference in its entirety, discloses techniques for calculating transformations to prevent image intra-frame distortion caused by a relative motion between the scene and the imaging platform, and preventing geometric differences from manifesting as smear within an integration time, thus preventing intra-frame distortion. However, this system relies upon controlling an optical element based on the transformation to prevent the image distortion, and may require more computations for intra-frame motion prevention.

Thus, systems and methods for providing feedback as to whether an electro-optical/infrared sensor is staring perfectly are desired without the aforementioned drawbacks. For example, a system that can determine whether errors exist in the sensor pointing solution, that may facilitate identification of one or more root cause(s) of such errors (e.g., biases in gimbal angle, trajectory error (particularly height, etc.), that can improving image quality by correcting such errors instantly and in future image acquisition in applications which are particularly susceptible to inter-frame changes (e.g., imaging platforms having a wide field of view and/or high angular rates of movement with respect to the ground) would be greatly appreciated.

SUMMARY

According to one or more embodiments, closed-loop systems and/or methods are provided that enable image frames to be captured by a moving platform-based sensor and to be displayed and/or processed, as if the platform motion never occurred and as if no geolocation errors (e.g., sensor gimbal angle, trajectory error including altitude, etc.) were present. In addition, the system and method can provide feedback (e.g., for pointing solution calibration purposes) on whether an electro-optical infrared sensor is staring perfectly at a point on the Earth, and help determine the root cause of errors in the imaging process. The identified errors may be fed back to the host system to enable perfect staring in future image acquisition and/or improved "freezing" of imagery for enhanced signal to noise ratio (SNR). This greatly facilitates and simplifies both human and machine target recognition when displayed.

In one embodiment, a system is provided for pointing error corrected imaging by a movable imaging platform including an imaging sensor (e.g., focal plane array sensor [this is not common terminology . . . perhaps an imaging sensor containing a focal plane array] configured to point at a constant point on Earth.) The pointing error may include sensor angular pointing errors, errors in knowledge of scene mean altitude, or platform altitude knowledge errors. One or more imaging processors may be configured to receive frames of a scene captured by the imaging sensor, wherein each frame comprises a plurality of scene pixels. The captured frames may be digitally transformed with respect to a common field of view (FOV), applying one or more transformations that compensate for apparent motion in the captured frames induced by relative motion between the scene and the movable imaging platform, such that the pixel size and orientation of pixels of the digitally transformed frames are the same. The processor(s) may then calculate any motion residuals, comprising any apparent motion remaining in the digitally transformed frames, based on inter-frame scene gradients between the digitally transformed frames. If any motion residuals are determined to remain in the digitally transformed frames, the processor(s) may fit a set of image eigenfunctions to the calculated motion residuals, in order to compute residual transformation coefficients representing a pointing error of the imaging sensor. The processor(s) may then apply the set of image eigenfunctions scaled by the residual transformation coefficients to the digitally transformed frames to compensate for the pointing error, and output the compensated digitally transformed frames.

In another embodiment, the imaging processor(s) may compare the computed residual transformation coefficients to residual transformation coefficients previously computed and stored in a database of motion residuals, in order to determine one or more causes of the pointing error (as described below). In certain embodiments, the imaging processor(s) may previously populate the database with residual transformation coefficients based on known or expected relative motion of the platform to the scene and on a known or expected pointing angle.

In another embodiment, the imaging processor(s) may correct the transformations applied to future image acquisitions based on the computed residual transformation coefficients.

In certain embodiments, only linear transformations are needed as image eigenfunctions to successfully identify the pointing error(s). However, in alternate embodiments the calculated motion residuals are compared to a selected or defined threshold value, and if the motion residuals exceed the threshold, additional eigenfunctions may be utilized, including rotation, scale, anamorphic stretch, skew and/or jitter.

In yet another embodiment, the imaging processor(s) may identify in the captured frames information representing one or more moving targets, remove that truly moving target information from the captured frames prior to digitally transforming the captured frames, and later add back in the information to the compensated digitally transformed frames. [this is not essential to the invention]

In other embodiments, the digital transformations comprise homography functions or eigenfunctions scaled by coefficient computed based on a known trajectory of the movable imaging platform and a known imaging sensor pointing angle relative to the scene being imaged.

In other implementations, methods may be provided for pointing error compensated imaging by performing some or all of the processing steps described above as performed by one or more image processors.

In yet another implementation, a non-transient computer readable medium may be provided having stored therein program instructions that, when executed by one or more processors, cause the processor(s) to provide for pointing error compensated imaging by performing some or all of the processing steps according to any of the methods described above.

These and other features and advantages of the system and method will be apparent from this disclosure. It is to be understood that the summary, drawings, and detailed description are not restrictive of the scope of the inventive concept described herein.

BRIEF DESCRIPTION OF THE FIGURES

The foregoing and other objects, features and advantages will be apparent from the following, more particular description of the embodiments, as illustrated in the accompanying figures, wherein like reference characters generally refer to identical or structurally and/or functionally similar parts throughout the different views. The figures are not necessarily to scale, emphasis instead being placed upon illustrating the principles of the embodiments, wherein:

FIG. 3C shows a perspective view of an exemplary use environment of an imaging platform relative to Earth FIG. 4A shows an imaging platform as both its altitude and angle from the zenith is reduced;

FIG. 4B shows a subsequent FOV scaled in both the X and Y-directions due to the reduction in altitude and zenith angle;

FIG. 5A shows an imaging platform as it approaches the reader in a direction perpendicular to the plane of the page;

FIG. 5B shows a subsequent FOV due to skew;

FIG. 6A shows a vector field of an exemplary transformation comprising a skew;

FIG. 7 shows a schematic of an exemplary system for identifying and correcting errors in pointing solutions for persistent observation sensors;

FIGS. 9A-9C show examples of intended optical flow, actual optical flow, and residual optical flow respectively;

FIGS. 13A through 13E are plots of experimental simulation test results.

DETAILED DESCRIPTION

Figure 1B:
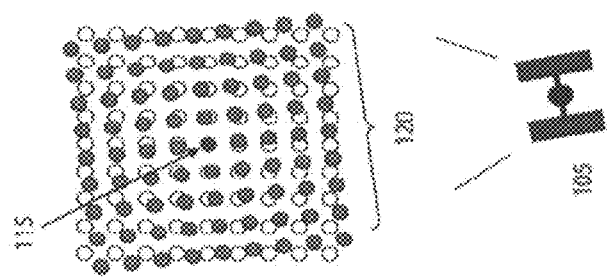
FIG. 1B shows changes between the initial FOV and a subsequent FOV.

In the description that follows, like components may be given the same reference characters, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

A system configured to capture images may include a movable imaging platform having a sensor that is configured to capture images of a scene, each image comprising a plurality of pixels; and one or more image processors for executing instructions for practicing the techniques described below. One technique involves the digital transformation of captured images with respect to a common field of view (FOV) so as to the "freeze" the imagery. The pixel size and orientation of the pixels of each transformed image are the same in the common FOV.

The images may include, for example, video images and/or multiple intermittent still images, collected by a sensor. In one or more implementation, the sensor may be a camera. The frame rate for video may be, for example, 30 frames per second (fps) or Hz. Frame rates may also be higher, such as, for example, 60 fps. Image frames may be digitally data and include a plurality of pixels, whether supporting various colors (e.g., red-green-blue (RGB) or cyan-yellow-magenta-black (CYMK)) or monochrome, and that are of sufficient resolution to permit a viewer to appreciate what is depicted therein. For example, the resolution may be 480 pixels in both width and height, or greater, such as 640×480, 800×800, 1024×768 or 1280×800, for example. Other resolutions (e.g., smaller and larger) are also possible.

U.S. Pat. No. 9,294,755, issued Mar. 22, 2016, entitled "Correcting Frame-to-Frame Image Changes Due to Motion for Three Dimensional Persistent Observations" (the '755 patent) and herein incorporated by reference in its entirety, showed that a priori information of platform trajectory and sensor point solution could be used to implement scene-wide transformations to enable "freezing" of imagery for enhanced signal to noise ratio (SNR) and motion detection. Satellites and aircraft have very precise knowledge of their location and are equipped with precision pointing systems, yet this knowledge may contain errors that detract from such techniques being able to ensure persistent staring at a point on the Earth. In situations where the system may not be making correct geolocation measurements of inter-frame geometric changes, due to such errors, residual image eigenfunction transformation coefficients (also referred to herein interchangeably as "Eigen coefficients") may be calculated based on inter-frame scene gradients between the digitally transformed frames, and the changes in these coefficients trended in order to estimate sensor pointing errors.

FIGS. 1-6 illustrate image change problems due to a moving imaging platform-based sensor. As mentioned above, persistent image and video sensors generally stay fixed to (or stare at, or focus on) a single point being tracked, for instance, on the ground, while the overhead imaging platform is in motion. However, motion of the platform and pointing solution errors (e.g., sensing system gimbal errors, altitude errors, etc.) can cause changes in scale, perspective (e.g. parallax), rotation, and/or other changes in viewing geometry. These changes can complicate or prevent human and/or machine interpretation of targets, features, and threats.

Figure 1A:
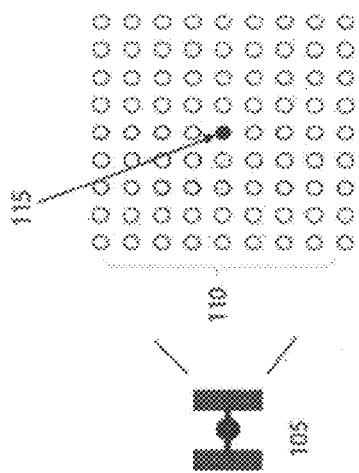
FIG. 1A shows an imaging platform and its initial field of view (FOV)

FIG. 1A shows imaging platform 105 (in this case, a satellite), having initial field of view (FOV) 110, capturing images while gazing at staring point 115 with a pointing solution. An initial image is sensed at initial detector points (e.g., pixels) (shown as open circles). However, in a subsequent image, the FOV of imaging platform 105 may change due to relative movement between the scene and imaging platform 105.

FIG. 1B shows that due to the motion of imaging platform 105 a subsequent FOV 120 is no longer coextensive with initial FOV 110 in a later image capture. For instance, while it is possible to align (center) staring point 115, the detector points (shown as darkened circles) are shifted with respect to the initial detector points. As a result, an image, or a composite image formed by combining images may be blurred.

Figure 2B:
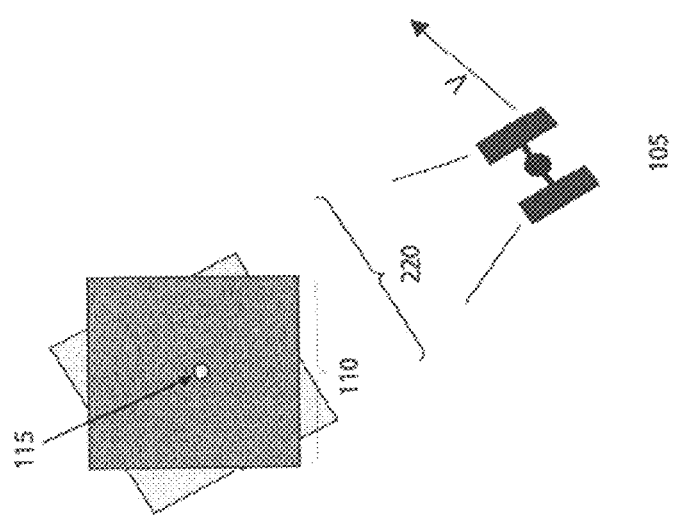
FIG. 2B shows a subsequent FOV due to the movement of the imaging platform between the initial and subsequent imaging time.
Figure 2A:
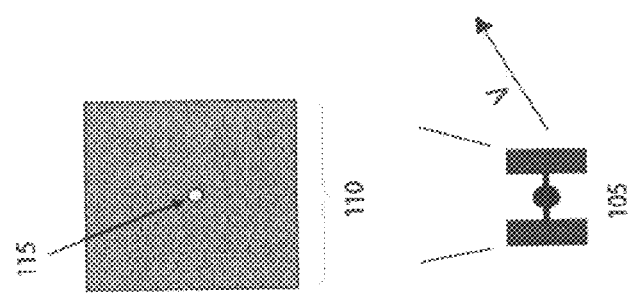
FIG. 2A shows an imaging platform and its initial FOV about a staring point.

FIGS. 2A-5C show examples of physical motions which may cause image change. FIG. 2A, for example, shows initial FOV 110 as imaging platform 105 stares at point 115 while the platform moves at velocity V. FIG. 2B shows a change of subsequent FOV 220 due to the overall motion.

The changes in the size and orientation of the FOV are decomposed into a series of eigenmodes.

Figure 3B:
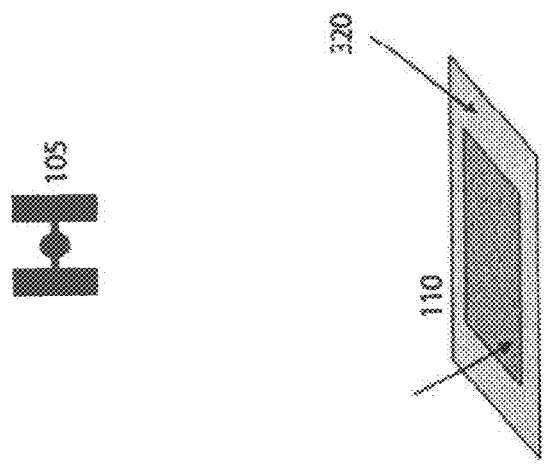
FIG. 3B shows a change in scale of a subsequent FOV of the imaging platform due to movement of the imaging platform toward the area being imaged.
Figure 3A:
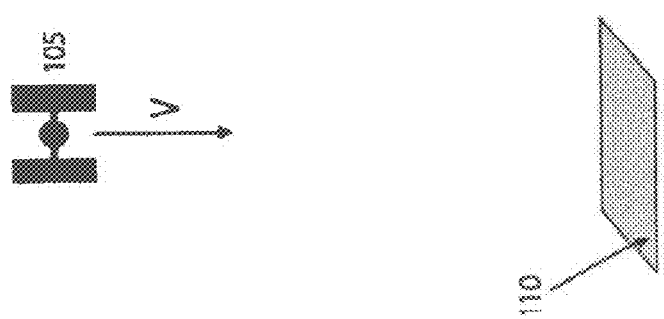
FIG. 3A shows an imaging platform and its initial FOV.
Figure 6B:
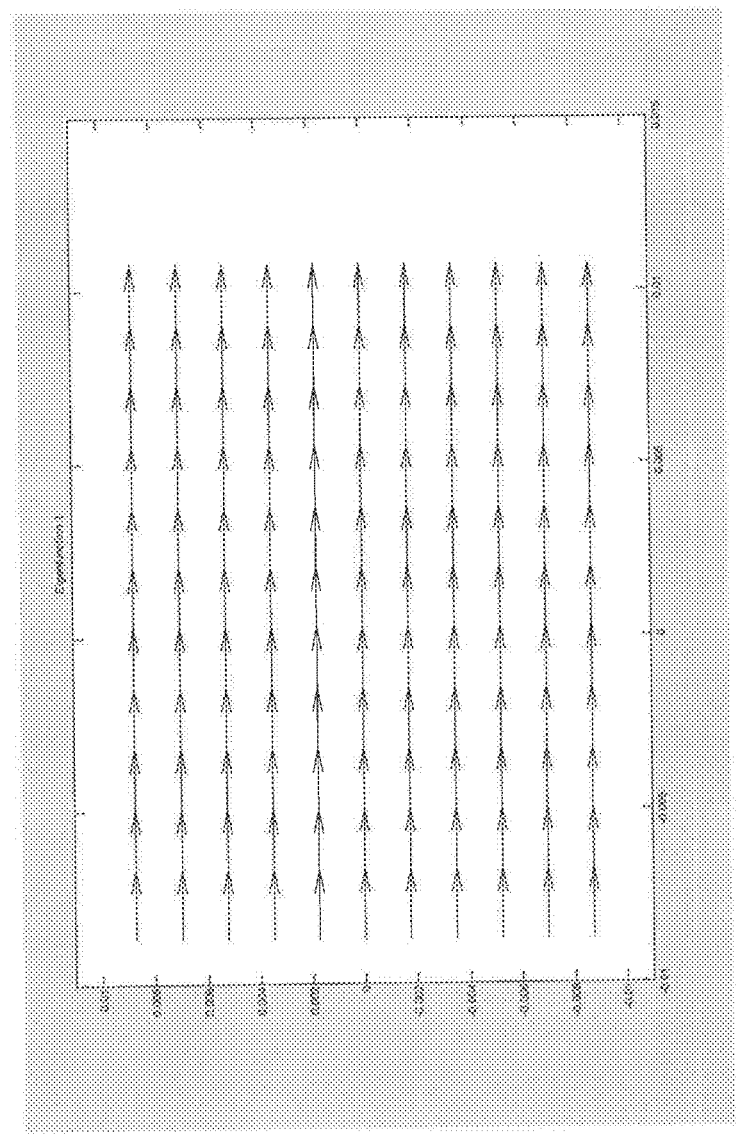
FIG. 6B shows a vector field of an exemplary transformation comprising linear X-motion.
Figure 6C:
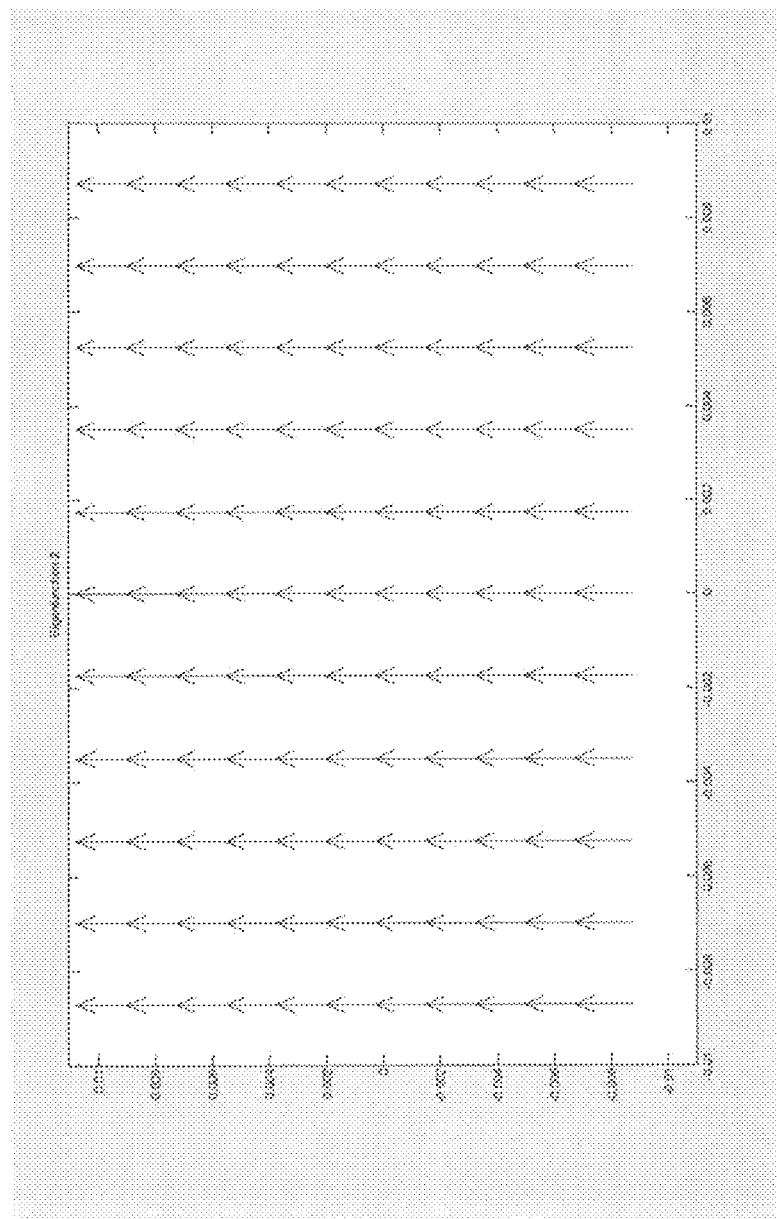
FIG. 6C shows a vector field of an exemplary transformation comprising a lineary Y-motion.
Figure 6D:
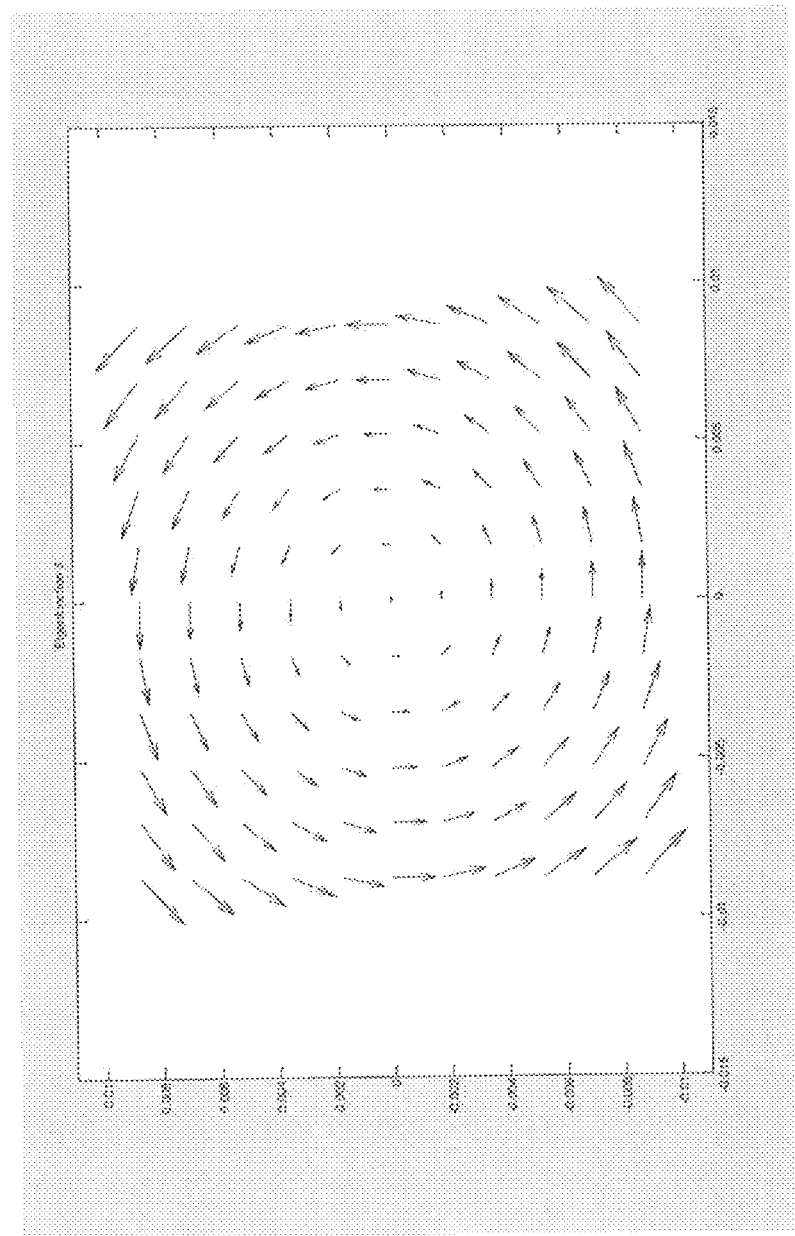
FIG. 6D shows a vector field of an exemplary transformation comprising a rotation.
Figure 6E:
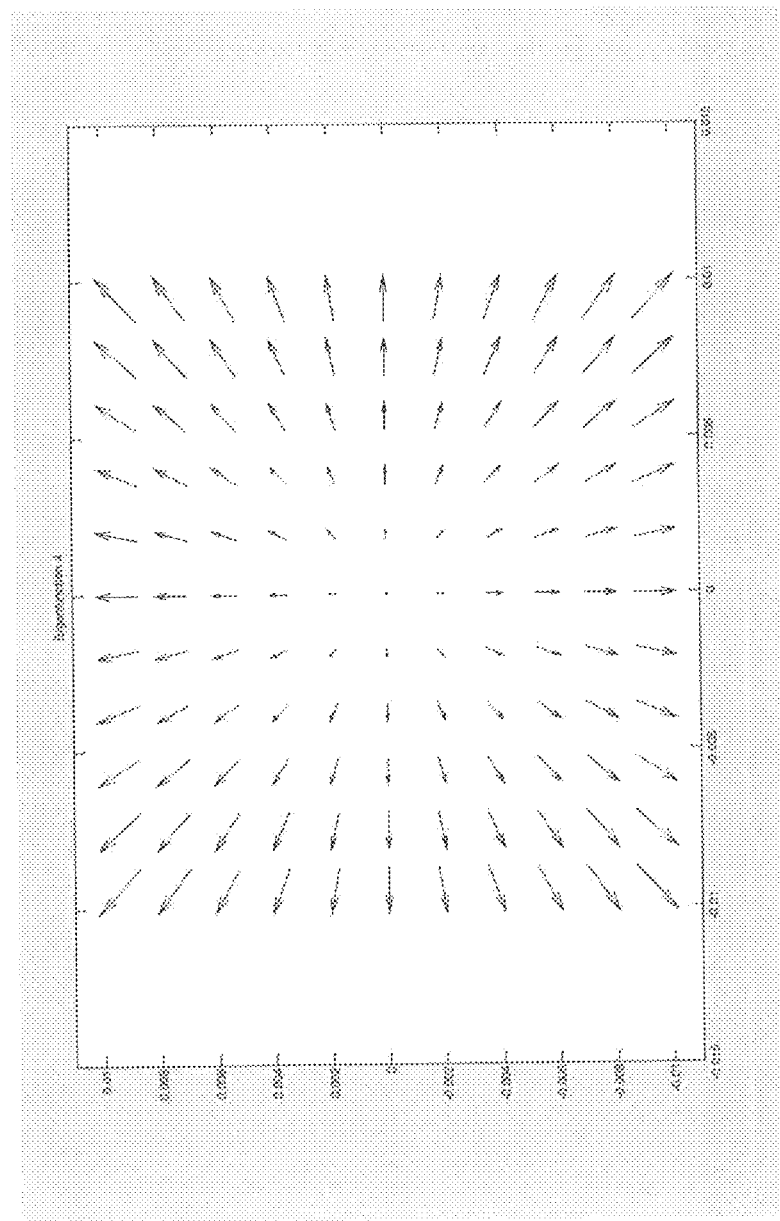
FIG. 6E shows a vector field of an exemplary transformation comprising change in scale.
Figure 6F:
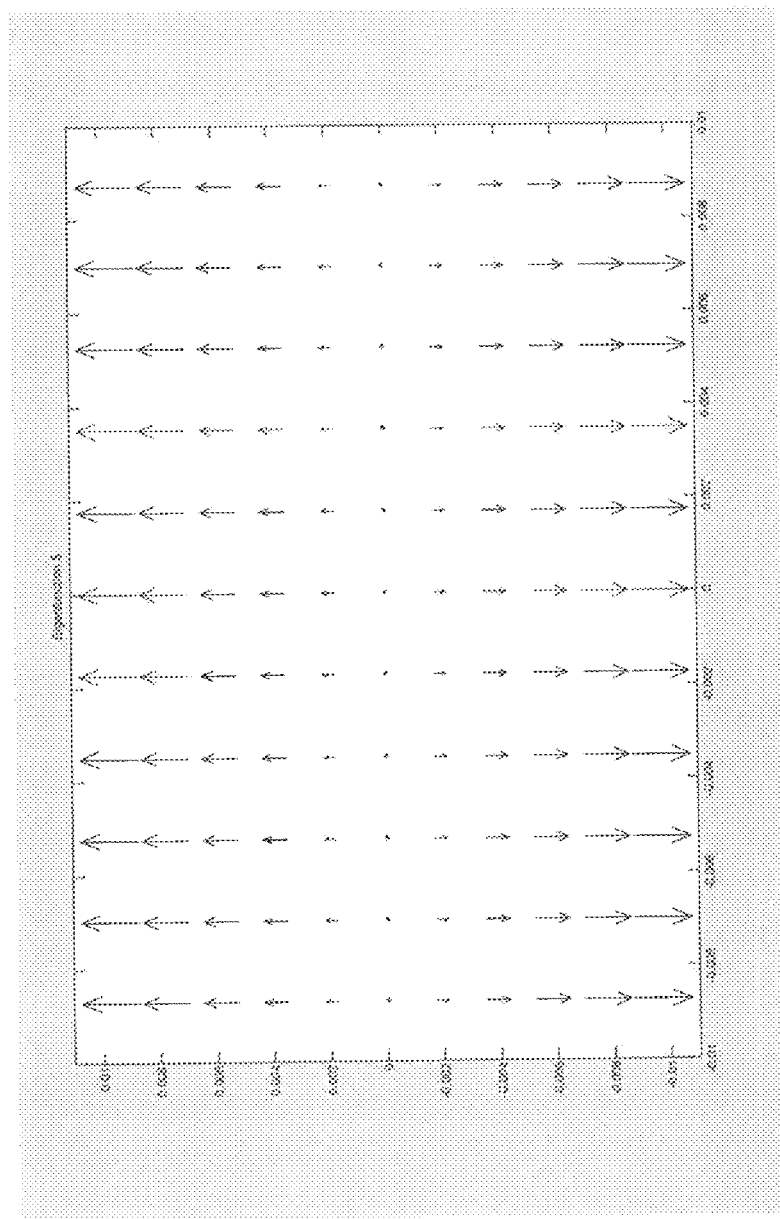
FIG. 6F shows a vector field of an exemplary transformation comprising an anamorphic stretch.

FIG. 3A shows initial FOV 110 as the altitude of imaging platform 105 is reduced. FIG. 3B shows scale changes of subsequent FOV 320. In this example, the change in scale is equal in both the horizontal and vertical directions since imaging platform 105 moves directly toward FOV 110. However, in general, the change in scale may be different along each axis. Changes in scale of the FOV also result in changes in the mapping of individual image pixels to the scene. FIG. 3C illustrates an additional perspective of the viewing geometry between imagining platform 105 and staring point 115 on the surface of the Earth 120. While global position systems (GPS) may provide very accurate information about the distance of imaging platform 105, measured from the center of the Earth 120, inaccuracies (e.g., due to non-uniform Earth surface elevation, etc.) in the relative distance between imaging platform 105 and the staring point 115 on the surface of the Earth may introduce residual errors in imagery not effectively compensated by previous techniques based on a priori platform motion information alone. In this example, which is the basis for simulation testing described below, imaging platform 105 is initially positioned along the x-axis (e.g., at an altitude of 400 km above a spherical Earth with radius 6371 km) and has an initial velocity V in the positive y-axis direction. FOV 110 is shown projected onto Earth pointed northward with a 5° nadir angle.

FIG. 4A shows imaging platform 105 approaching both the zenith and the area being imaged. FIG. 4B shows an anamorphic scale change of subsequent FOV 420. In particular, subsequent FOV 420 is scaled in both the X and Y directions due to the reduction in altitude of imaging platform 105. Further, subsequent FOV 420 is scaled in the Y-direction more than in the X-direction because line-of-sight 425 remains perpendicular to the X-axis while angle 430 changes with respect to the Y-axis due to the change in zenith angle.

FIG. 5A shows imaging platform 105 having line-of-sight 525 moving with velocity V (i.e., approaches the reader in a direction perpendicular to the plane of the page). FIG. 5B shows initial FOV 110 and subsequent FOV 520 caused by skew change. FIG. 6A shows an alternative depiction of skew as a vector field. The lengths of the vectors correspond to magnitudes of the displacement from the line of site.

These and other detected inter-frame image changes due to movement of the imaging platform-based sensor may be initially corrected as a first step using the imaging system and method described herein, in one or more embodiments, which digitally transforms successive images with respect to a common FOV such that the successive images appear to viewed from the same non-moving platform. The pixel size and orientation of pixels of each transformed image are the same or common. After transformation, the scene may contain residual motion that can then be measured and used to compute and correct pointing errors.

FIGS. 6A-6F show vector fields associated with various eigenmode change transformations for providing the stationary view. In particular, they illustrate skew (FIG. 6A), linear motion in the X-direction (FIG. 6B), linear motion in the Y-direction (FIG. 6C), rotation (FIG. 6D), scale or gain (FIG. 6E), and anamorphic stretch (FIG. 6F), respectively, which may be performed by the imaging system (and method) according to embodiments.

FIG. 7 shows a schematic of an exemplary imaging system 700 for residual geolocation error root cause identification and/or pointing solution correction for 3-D persistent observations, according to an embodiment.

System 700 captures one or more images of scene 705 via sensor optics 710, which may comprise multiple reflective and/or transmissive lens elements. Images of scene 705, as modified by sensor optics 710, are focused onto sensor 720. More particularly, sensor optics 710 receives electromagnetic radiation (light) from scene 705 and focuses the received electromagnetic radiation (light) onto sensor 720. In one implementation, sensor optics 710 may include an objective lens, or other conventional optics, such as one or more mirrors and/or lenses. Imaging platform 105 may use high precision gimbal mounts (not shown) to achieve a desired pointing solution for sensor optics 710 and/or sensor 720.

Sensor 720 may be mounted on a moving platform, such as an airborne or space-based imaging platform 105 (shown in FIGS. 1A-5B), that is configured to collect image frames. Sensor 720 may include any two-dimensional (2-D) sensor configured to detect electromagnetic radiation (light) corresponding to the entering light of interest and generate image frames, whether still or video image. Exemplary electromagnetic radiation detectors may include complementary metal-oxide-semiconductor (CMOS), charge-coupled device (CCD), or other detectors having sufficient spectral response to detect electromagnetic radiation (light) of interest, for example, in the infrared (IR), visible (VIS), and/or ultraviolet (UV) spectra. In one implementation, sensor 720 may be a focal plane array (FPA) sensor.

Relative motion between imaging platform 105 and scene 705 may be determined to minimize motion, oscillation, or vibration induced frame-to-frame image changes. A variety of sources can provide input data 715 describing the relative motion of imaging platform to the target and viewing geometry of the sensor relative to the imaging platform 105. For example, imaging platform 105 may have a predetermined ground track (e.g., deterministic path) for imaging selected terrain. Accordingly, input data 715 may comprise control data specifying the route and/or trajectory of imaging platform 105. Input data 715 may also be provided by one or more trajectory sensors (not shown), either alone or in combination with control data, to directly detect the motion of imaging platform 105 or the relative motion between imaging platform 105 and scene 705. According to various embodiments, trajectory sensors can include inertial, global positions system (GPS), image processors, velocity (speed), acceleration, etc. They may include mechanical, electro-mechanical, piezoelectric, optical, sensors, radar (ladar), or the like, which are included with the flight systems or avionics of imaging platform 105 or otherwise separately provides. Trajectory sensor(s) may be configured provide to provide various data, including one or more of: velocity (speed), directional heading, and angular heading, for example, of moving imaging platform 105. Data output from sensor 720 may be configured for Cartesian coordinates, Polar coordinate, cylindrical or spherical coordinates, and/or other reference coordinate frames and systems. In one implementation, imaging platform 105 may implement a World Geodetic System WGS-84 oblate Earth coordinate frame model.

An image processor 730 may be configured to receive image frames from sensor 720 (and other data gathering devices, such as trajectory sensors or the like) and perform image processing, as discussed herein. Image processor 730 may include hardware, such as Application Specific Integrated Circuits (ASICs), Field Programmable Gate Arrays (FPGAs), digital signal processors (DSPs), or other integrated formats. However, those skilled in the art will recognize that processor 730 may, in whole or in part, be equivalently implemented in integrated circuits, as one or more computer programs having computer-executable instructions or code running on one or more computers (e.g., as one or more programs running on one or more computer systems), as one or more programs running on one or more processors (e.g., as one or more programs running on one or more microprocessors), as firmware, or as any combination thereof, and that designing the circuitry and/or writing the code for the software and/or firmware would be well within the skill of one skilled in the art in light of this disclosure.

In some embodiments, image processor 730 may be located directly on imaging platform 105 and/or with sensor 720. As such, the transformed imagery can be directly transmitted to users who can view the imagery without the need for any additional image processing. However, this need not be the case. Thus, in some embodiments (as shown), image processor 730 may be separate from imaging platform 105. For instance, image processor 730 may be ground-based (such as, at a command center). In another instance, image processor 730 may be vehicle-based, such as, for example, in an automobile, tank, helicopter, airplane, ship, submarine, or the like. Of course, image processor 730 might also be located with users, such as within a display device 750, user terminal 755 or other portable device.

Sensor 720 and image processor 730 may communicate and/or share information and data, preferably, in "real-time," via one or more connections and/or networks there between. Sensor 720 may transmit image frames, trajectory information, and sensor viewing information to image processor 730 by any means (including, for instance, radio, microwave, or other electromagnetic radiation means, optical, electrical, wired or wireless transmissions or the like). In addition, networked communication over one or more digital networks, such as intranets and Internet are possible.

In some instances, memory device 725 (which may also be referred to as a cache or stack) may temporarily or permanently store image frames collected by sensor 720 for subsequent processing by image processor 730. Memory device 725 may be located, for example, with sensor 720 or alternatively with image processor 730.

Figure 8:
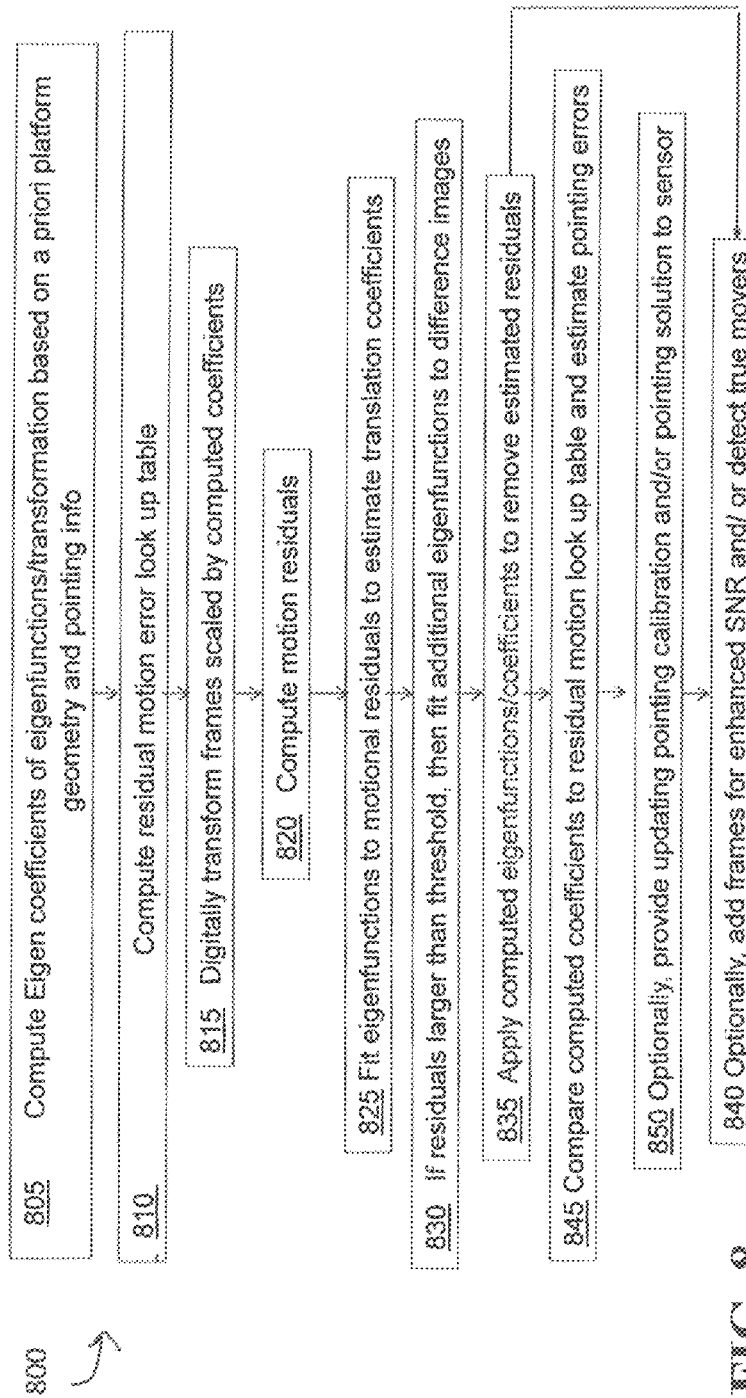
FIG. 8 shows an exemplary schematic for processing performed by a system in accordance with an embodiment.

FIG. 8 illustrates a flow diagram of an exemplary process 800 using system 700, according to an embodiment. Referring to both FIGS. 7 and 8, in step 805, coefficients of eigenfunctions may be computed, based on imaging platform 105 geometry and pointing information. Exemplary techniques for performing this operation are described in the '755 patent cited and incorporated by reference above.

According to an embodiment, computing the image transformation coefficients may involve determining frame-to-frame changes for persistent video frames 728 acquired by sensor 720, for example, based on a function of platform trajectory and sensor pointing angles with respect to a fixed FOV. Inter-frame changes for a persistent video collection may be determined or computed for image frame sets (i.e., sequences of images) as well as super-frame sets (i.e., multiple frame sets). As used herein, "inter-frame" refers to aspects between image frames, also referred to as "frame-to-frame."

The image frames 728 may be collected by the sensor 720 at different times or instances. In some instances, these frames 728 may be adjacent or successive image frames, such as in the case for typical video. In others, the frames may be processed at different times but not necessarily in the order collected by the sensor 720.

Many short exposure images (e.g., 1 to 100 ms) of the scene 705 may be taken by the sensor 720. The exposures are selected to be sufficiently short that the imaging platform motion within one exposure period (or image) is expected to be relatively small. Successive frames are then manipulated or transformed to have the appearance of being viewed by a stationary viewer.

It will be appreciated that the sensor 720 need not be trained on any particular location in the scene 705. Rather, the transformations and geolocation error correction may provide a scene that appears to be taken from a non-moving platform (with exception of actual moving objects), and accounting for geolocation errors. Truly moving objects may be more readily detected by an observer since the background is approximately stationary.

As shown, image processor 730 may include a look up table (LUT) builder 726, geometry prediction module 732, image frame transform module 734, residual error module 736, resolution enhancement module 738, LUT comparison module 742 and pointing error module 744. According to various embodiments, the processes described can be implemented with a variety of microprocessors and/or software, for example. In some implementations, one or more modules (of their functionality) may be combined or omitted. Other modules and functions are also possible. Further, image processor 730 can be implemented onboard and/or off-site of imaging platform 105 (e.g., at a ground location physically separated from imaging platform 105).

Image processor 730 may be configured to utilize planar, spherical, or oblate earth models, relief or topographic models, 3-D models of man-made objects, and/or terrain elevation maps.

During operation of step 805, geometry prediction module 732 may be configured to determine the nature and degree of change between different images collected by sensor 720 by receiving input data 715 and determining one or more transformation functions 733 which mathematically describe the inter-frame change due to movement of imaging platform 105 and/or sensor 720 relative to a target in scene 705. In one embodiment, the transformation function 733 may be Eigen transformations with each eigenfunction being directly translatable into a digital adjustment of image frame data for counteracting and/or preventing the determined inter-frame changes.

Moreover, geometry prediction module 732 may receive input data 715 indicating the relative motion, trajectory of imaging platform 105 and sensor viewing geometry, which is used to output one or more model eigenfunctions to correct for image change. Geometry prediction module 732 may compute from the received input data 715 inter-frame FOV mapping to the ground for each set of image frames 728. This may include, for example, taking the difference between different image frames on a pixel-by-pixel basis. For video, these may be successive frames. Geometry prediction module 732 may select one or more image transformations to correct for the inter-frame differences (gradients) in the FOV. For instance, the changes between the initial and subsequent FOV may be modeled by Eigen transformations describing a set of adjustments which are capable of compensating for all image changes induced by platform motion. In particular, they may comprise one or more of the Eigenfunction transformations shown in FIGS. 6A-6F for scaling with Eigen transformation coefficients. Geometry prediction module 732 may then perform modeling to find "best-fit" Eigen transformation coefficients for each Eigen mode for the one or more selected Eigen transformations. The transformations may be optimized by calculating "best fits" or coefficients to minimize mean-square error (MSE) or the maximum error, for example. After calculating best fits, the modeled Eigen transformations characterizing correcting image distortion are outputted to LUT builder 726.

Optionally, prior to determining the Eigen transformations and coefficients, geometry prediction module 732 may identify in the frames 728 information representing one or more truly moving objects, and remove the identified information (for addition back to the image frames at the end of image processing.)

With reference again to FIG. 8, in step 810 LUT builder 726 computes a LUT 743 of residual errors representing sensor optics pointing error, height/altitude errors, or other conceivable errors. These residual errors comprise the residual errors not attributable to relative motion between the imaging platform 105 and scene 705. The LUT 743 may contain many sets of Eigen transformation coefficients, each associated with a different pointing error. For example, any 100 collected frames of data may include sets of Eigen transformation coefficients for each frame and for each hypothetical error. These may be computed a priori or off line, and would be specific to a given nominal platform geometry and nominal set of pointing angles (e.g., with respect to nadir.) After collecting the 100 frames, the motion residuals would be measured and then, if above a threshold, the motion residuals would be fit to the eigenfunctions to compute the residual transformation coefficients. The computed residual transformation coefficients may then be compared to the LUT (e.g., using a nearest neighbor comparison, etc.) to determine the nature of the pointing errors.

In step 815, image frame transform module 734 applies the selected image Eigen transformations (shown in FIGS. 6A-6F) multiplied by the Eigenfunction coefficients to the image frames 728 so as to digitally transform the image frames 728 of scene 705 with respect to a common FOV. This results in image frames that appear to be collected by a non-moving imaging platform, in which the pixel size and orientation of pixels are the same and that any motion remaining in the digitally transformed frames comprises motion residuals.

In step 820, residual error module 736 computes apparent motion residuals by determining inter-frame differences/gradients between the digitally transformed frames output by image frame transform module 734. This technique involves measuring line of sight error using scene data in the digitally transformed frames only, i.e., no additional a priori platform motion information is required.

In step 825, residual error module 736 fits the Eigen transformation functions for linear motion direction and linear X-direction (FIG. 6B) and linear Y-direction (FIG. 6C) to the motion residuals to estimate residuals translation coefficients. Residual error module 736 is configured to determine the nature and degree of change between successive digitally transformed image frames 728 and to apply the linear transformation functions that mathematically describe the inter-frame change to create difference or gradient images. Residual error module 736 may, prior to comparing successive frames, co-register the successive digitally transformed image frames, based on the fixed, known spatial relationship between or among the co-registered residual error frames. Residual error module 736 fits the scene-wide residual motion difference or gradient images to the X-direction and Y-direction linear eigenfunctions (described above and shown in FIGS. 6B-6C) to determine the appropriate one or more transformation(s) and a corresponding optimal set of translation residuals Eigen coefficients for compensating for geolocation errors. Residual error transform modeling may be performed to find "best-fit" residuals transformation coefficients for each eigenfunction for the one or more translation eigenfunction transformations. For example, the transformations may be optimized by calculating "best fit" residuals transformation coefficients that minimize mean-square error (MSE) or the maximum error. In step 830, residual error module 736 may determine whether the residuals are greater than a selected threshold. The residuals have a size measured in scene pixels or ground sample distance. If any of the residuals are larger than a user-selected threshold, the operations continue. If the residuals are smaller than the threshold, meaning that the linear translation transformations were sufficient to compensate for the residual errors, the translation residuals transformation coefficients and linear transformations are passed to resolution enhance module 738. If, however, the residuals are greater than the selected threshold, then in step 830 one or more additional transformations—e.g., skew (FIG. 6A), rotation (FIG. 6D), scale (FIG. 6E), and/or anamorphic stretch (FIG. 6F) (others may be possible)—are fit to the difference/gradients associated with the digitally transformed image frames 728. After calculating best fits, the modeled eigenfunction transformations using all six eigenfunctions and their computed residuals transformation coefficients may be output to resolution enhancement module 738.

The inventors have determined that the application of the two linear eigenfunctions (X-motion and Y-motion) may prove sufficient for characterizing the vast majority of pointing/geolocation motion (e.g., caused by gimbal pointing error and/or height error) still present in the post-digitally transformed frame images 728. The "expected" residual errors typically manifest in easily detected linear translation errors, though other transformation motions may be fit as needed. For example, FIGS. 9A-9C provided a simulation experiment illustrating this principle. FIG. 9A represents an optical flow for an intended pointing solution. FIG. 9B depicts the optical flow actually observed after purposefully introducing a gimbal pointing error comprising a nadir angle error of 0.01 degrees (174 urad) from a nominal nadir of 30 degrees (azimuth 0°). FIG. 9C represents the residual optical flow, which is almost entirely a linear translation transformation for many of the errors.

Those of skill in the art of image processing will readily appreciate that the estimation of residual transformation(s) performed by residual error module 736, including for example, the two to six identified eigenfunction transformations (and/or others) utilized and associated residuals transformation coefficients for estimating and correcting the residual geolocation error, using scene-wide changes as described herein could be performed with alternative techniques, such as by using sub-frame groups of pixels, however, such approaches would likely be computationally more burdensome.

Referring again to FIGS. 7 and 8, in step 835, resolution enhancement module 738 applies the two or more computed eigenfunctions and associated residuals transformation coefficients to the digitally transformed image frames to remove the estimated residual motion from the digitally transformed frames. Resolution enhancement module 738 is configured to enhance the resolution of transformed image frames, for example, by interpolating and transforming imagery to remove residual motion of successive frames, increasing sampling of aggregate images due to naturally occurring movement of pixels as mapped to the ground. This may be further aided by deterministic frame shifting.

In one implementation, a resolution enhancement process may be implemented by resolution enhancement module 738. Images of improved resolution images, for example, may be generated by interpolating and aggregating images according to known algorithms, such as frequency or space domain algorithms. The images are not highly oversampled per se but a sequence of images that are ultimately aggregated become highly oversampled by virtue of recognizing the naturally occurring changes in the sensor FOV and then creating a tailored, non-uniformly spaced interpolation grid based on these naturally occurring changes. One benefit of super-resolution processing is improved edge contrasts. In some instances, the enhanced images may enable a high "rating" according to the National Imagery Interpretability Rating Scale (NIIRS). Additional sub-pixel steering of the field of view may be employed to further enhance the sampling of the scene.

One or more users may interface with system 700. Users typically will be located remotely from imaging platform 105 and/or image processor 730, for instance. Of course, users may also be located on imaging platform 105, and/or a location near image processor 730. In one or more implementations, users can communicated with, and/or share information and data with image processor 730 by any means (including, for instance, radio, microwave, or other electromagnetic radiation means, optical, electrical, wired, and wireless transmissions or the like). In addition, networked communication over one or more digital networks, such as intranets and Internet are possible.

User display 750 may be configured to enable one or more users to view motion and geolocation error corrected image frames (e.g., stills or video) output from image processor 730. User display 750 may include, for instance, any display device configured for displayed video and/or image frames. Televisions, computer monitors, laptops, tablets computing device, smart phones, personal digital assistant (PDAs) and/or other displays and computing devices may be used. User terminal 755 may be configured to enable users to interact with image processor 730. In some implementations, users may be presented with one or more data acquisition planning tools.

Video sequences of the transformed imagery may be displayed, in which static, moving, and/or 3-D objects may be identified (e.g., highlighted, color-coded, annotated, etc.) in the displayed image(s) of the scene. As such, human and machine interpretation is greatly facilitated. No additional digital image processing may be required once the images are transformed, in many instances.

Figure 10A:
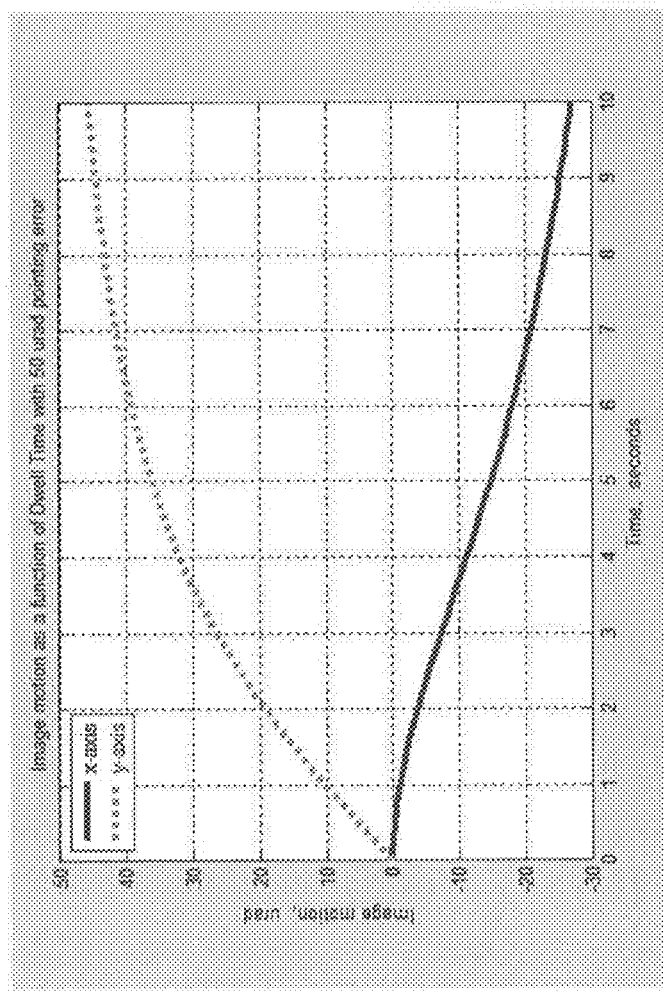
FIGS. 10A and 10B are plots illustrating experimental simulated testing results of a model of a satellite imaging platform over the Earth.
Figure 10B:
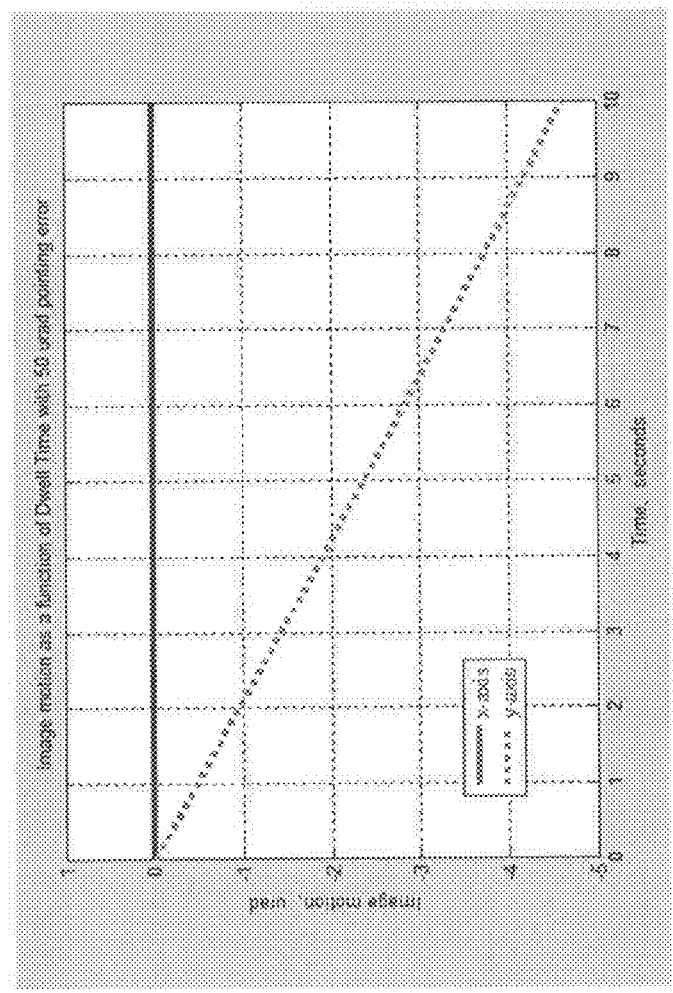

In step 845, LUT comparison module 742 compares the computed residual transformation coefficients to residual transformation coefficients stored in residual motion LUT 743. Trends in residual motion revealed by this comparison permits estimation of pointing (geolocation) errors in the present pointing solution. FIGS. 10A and 10B illustrate experimental simulated testing results using the satellite imaging platform and Earth model shown in FIG. 3C, wherein the satellite is initially positioned along the x-axis and has an initial velocity V in the positive y-axis direction. The FOV initially projects onto Earth pointed northward with a 5° nadir angle. FIG. 10A illustrates the time evolution (trend) of residual motion error (e.g., similar data possibly being stored in the LUT 743 for comparison purposes) with an induced 50 urad pointing error in the nadir direction. The graph demonstrates that virtually all of the induced error may be measured using the two linear translation (X-motion, Y-motion) eigenimages. FIG. 10B illustrates the trend over time of residual motion errors with an induced 10 meter surface altitude (height) error. The graph illustrates that this error may be virtually entirely measured in one translation (Y-motion) eigenimage.

Figure 11:
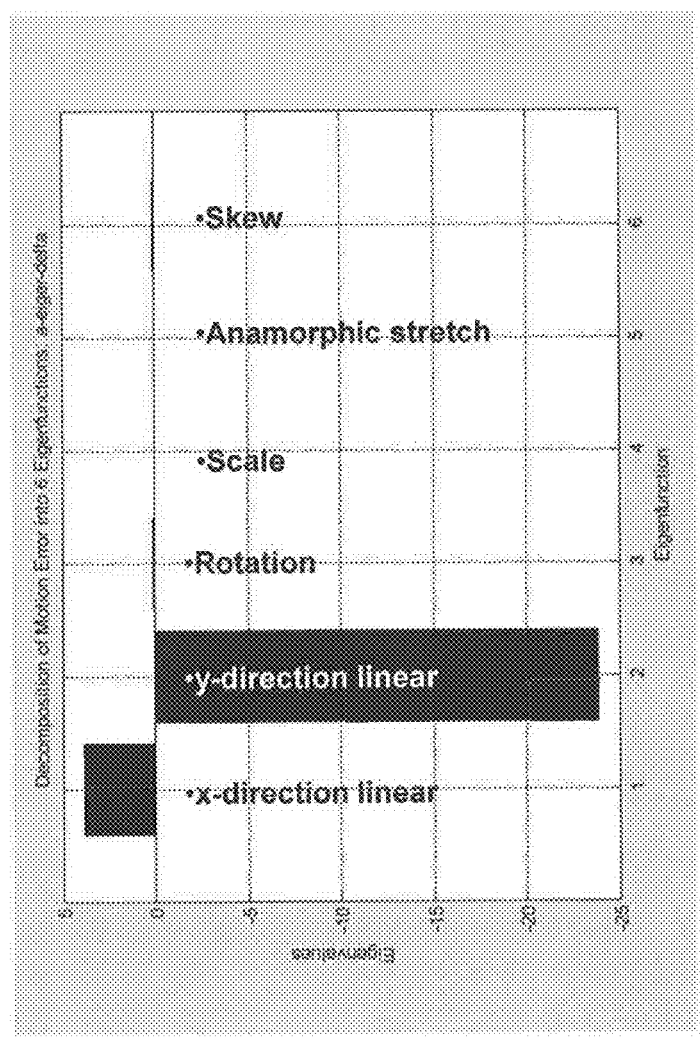
FIG. 11 is a plot of example simulation results showing differences in eigenfunction coefficient amplitudes obtained between an ideal case and an induced error case.

In step 850, pointing error module 744 may optionally interpret such trending and curve-fitting. of the residual transformation coefficients representing residual motion errors computed for a current frame to previously stored residual motion data so as to determine which of several possible root causes of the residual error is most likely responsible. LUT 743 may comprise sets of points and/or curve-fits for a given number of frames. FIG. 11 is a plot of the simulation results for the difference in eigenfunction coefficient amplitudes obtained between the ideal case and the induced 10 meter surface height knowledge error case. The results demonstrate how virtually all of the residual motion error may be measured with the two translation eigenfunctions. Pointing error module 744 may provide feedback regarding whether sensor 720 is staring perfectly at a point on the Earth. The computed pointing (geolocation) errors may be output to update pointing calibration and/or pointing solution information at sensor optics 710. This enables adjustments in the pointing solution for future scene imaging with perfect persistent observations ("staring") and/or image frame freezing, such as is useful in motion detection. Pointing error module 744 may also output an indication of the root cause of the pointing error, such as biases in gimbal angle and/or trajectory error (especially height.) The computed residuals transformation coefficients may also be used to adjust the one or more Eigenfunction transformations that compensate for the apparent motion in the scene induced by relative motion between the scene and the movable imaging platform.

The scene wide transformations employed to enable "freezing" of imagery may be used for enhanced motion detection, and frame stacking may be used to enhance SNR. In step 840, resolution enhancement module 738 may optionally add or sum a plurality of successive compensated digitally transformed frames to obtain higher SNR scene imagery and/or to detect truly moving objects in the imagery. If "true mover" information had previously been identified and removed from the captured image frames 728, such information may be added back into the compensated digitally transformed frames. In some instances, the enhanced images may enable a high "rating" according to the National Imagery Interpretability Rating Scale (NIIRS).

Figure 12A:
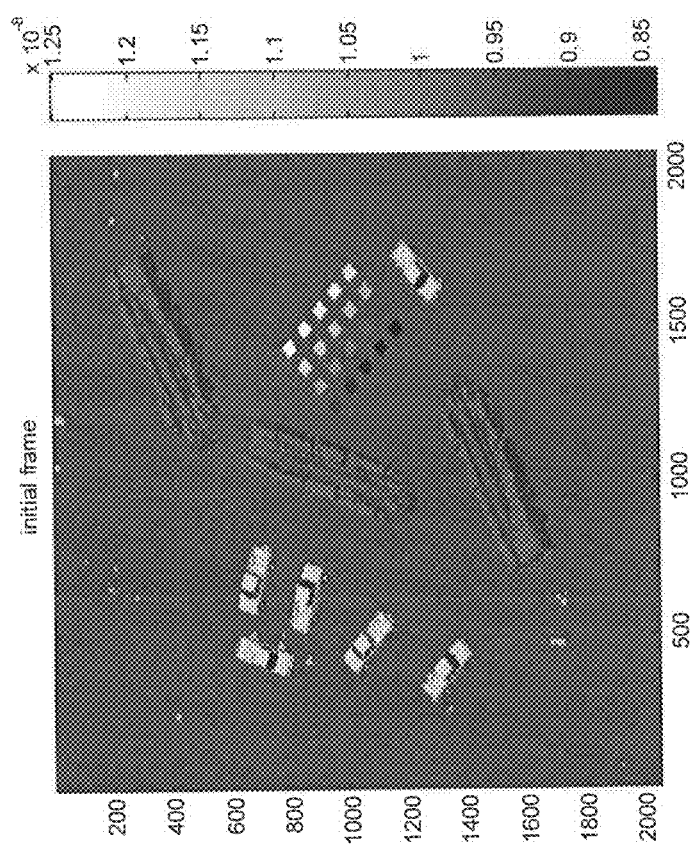
FIGS. 12A through 12C illustrate simulated frames of video data of an exemplary scene as if rendered by a sensor from an airborne imaging platform.
Figure 12B:
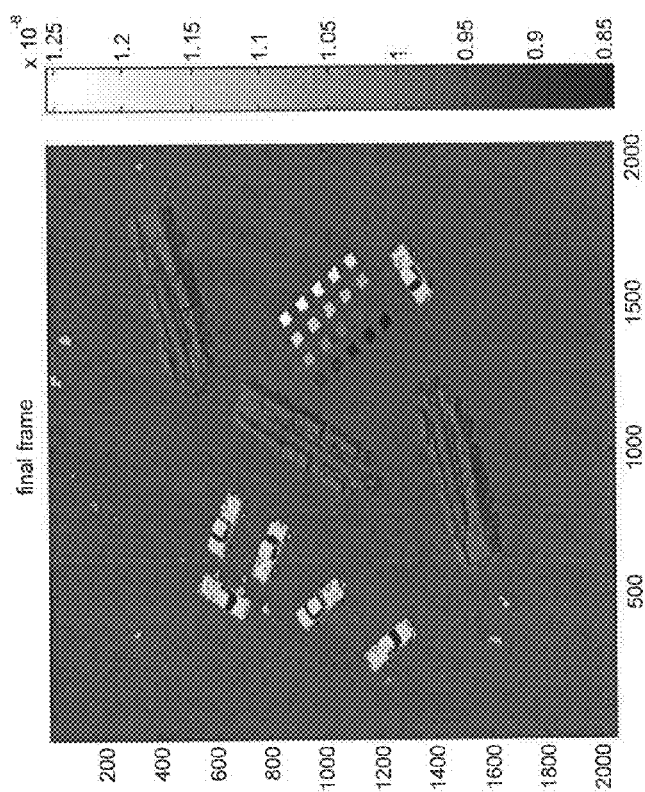
Figure 12C:
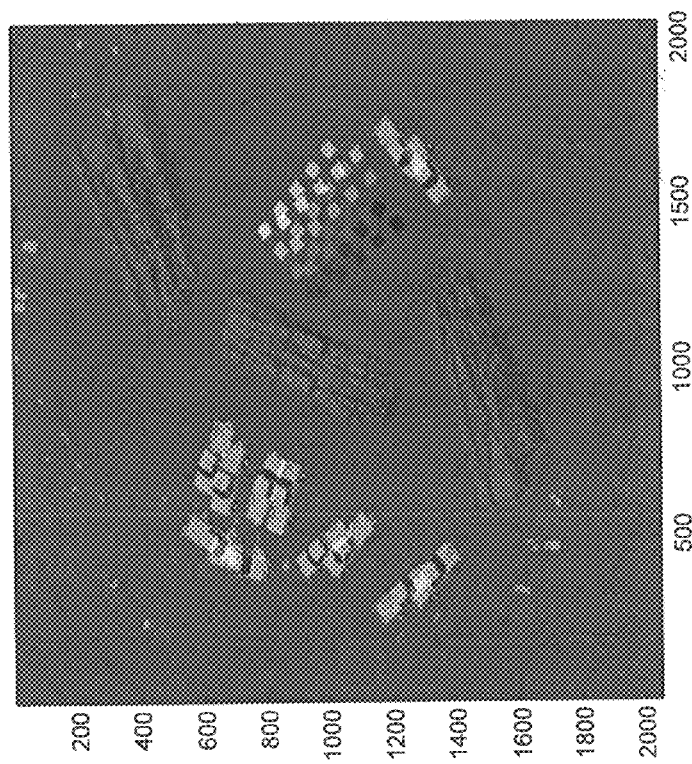

FIGS. 12A through 12C illustrate simulated frames of video data of an exemplary scene as if rendered by a sensor from an airborne imaging platform. FIG. 12A shows a simulated initial frame with no motion or geolocation error correction applied. The scene includes a plurality of vehicles, including pick-up trucks and mobile (e.g., SCUD) missile launchers. FIG. 12B shows a simulated frame of video data of the same scene as shown in FIG. 12A, at a second instance. The images are taken shortly apart, and thus have a different angle separation. The image depicted in the FIG. 12B has changed slightly with regard to scale, rotation, and/or viewing angle. Moreover, the image appears slightly more stretched in one dimension (horizontal) than the other. FIG. 12C shows the residual motion error after platform motion induced error has been removed from the frame. The plot maps the movement of the pixels to the ground. The length and direction of the vector arrows show the movement of pixels from one frame to another.

Figure 13A:
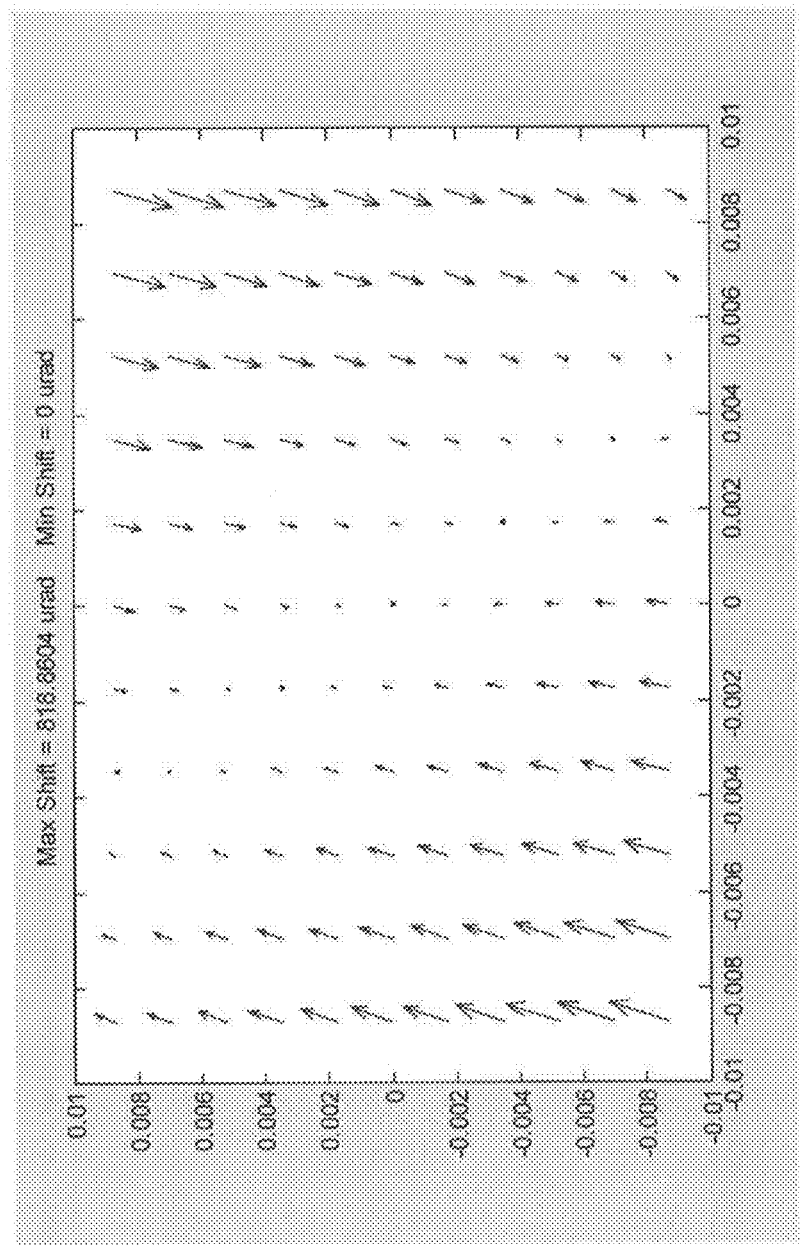

FIGS. 13A through 13E are results from addition simulation testing undertaken to explore the dependence of residual motion error on the magnitude of induced pointing bias. The simulation assumed conditions of a satellite imaging platform at 400 km altitude, a sensor looking down at a nadir angle of 20°, the sensor looking broadside perpendicular to the velocity vector V, collection time of 10 seconds, FOV of 1°, a sensor controller attempting to keep the center of the FOV pointed at the same location on the ground for the duration of the collection time, perfect knowledge of the satellite position and planar Earth surface altitude, gimbal azimuth singularity at horizon, and two sensor bias cases—0 and 50 urad in the nadir direction. FIG. 13A shows the motion of image points in a focal plane frame of reference. With perfect knowledge of the satellite ephemeris, surface altitude and sensor point, the error at the center of the FOV is zero. FIG. 13B shows the image motion with a pointing bias of 50 urad. A consequence of the pointing bias is that even the center point of the FOV exhibits a small amount of motion on the focal plane. The true ground intersection point is not stationary, as expected, due to the pointing bias. FIG. 13C shows the difference in image motion between the ideal and actual cases. The image motion difference between the expected and actual motion over the 10 second collection time is about 24 urad. FIG. 13D shows the residual motion once the common platform motion displayed on the chart of FIG. 13C is removed. FIG. 13E shows the dependence of the residual motion error on the magnitude of the induced nadir angle pointing bias. Similar curves could be used to determine the size of pointing bias in non-simulation image processing.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system for pointing error corrected imaging by a movable imaging platform including an imaging sensor, comprising:
   one or more processors configured to:
      receive frames of a scene captured by the imaging sensor, each frame comprising a plurality of pixels;
      digitally transform the captured frames with respect to a common field of view (FOV), the one or more transformations compensating for the apparent motion in the scene induced by relative motion between the scene and the movable imaging platform, such that the pixel size and orientation of pixels of the digitally transformed frames are the same;
      calculate any motion residuals, comprising any apparent motion, remaining in the digitally transformed frames based on inter-frame scene gradients between the digitally transformed frames;
      if any motion residuals remain in the digitally transformed frames,
         fit a set of image eigenfunctions to the calculated motion residuals to compute residual transformation coefficients representing a pointing error of the imaging sensor,
         apply the set of image eigenfunctions scaled by the residual transformation coefficients to the digitally transformed frames to compensate for the pointing error, and
         output the compensated digitally transformed frames.

2. The system of claim 1, wherein the one or more processors are further configured to:
   compare the computed residual transformation coefficients to residual transformation coefficients previously computed and stored in a database of motion residuals in order to determine one or more causes of the pointing error.

3. The system of claim 2, wherein the one or more processors are further configured to initially populate the database with residual transformation coefficients based on a known or expected relative motion of the platform to the scene and a known or expected pointing angle.

4. The system of claim 1, wherein the one or more processors are further configured to correct future image acquisition based on the computed residual transformation coefficients.

5. The system of claim 1, wherein the pointing error comprises at least one of sensor pointing error, scene mean altitude error, or platform altitude error.

6. The system of claim 1, wherein the set of image eigenfunctions consists of linear translations.

7. The system of claim 1, wherein, if the calculated motion residuals are greater than a threshold value, the set of eigenfunctions comprise linear translation, rotation, scale, anamorphic stretch, skew and jitter.

8. The system of claim 1, wherein the one or more processors are further configured to:
identify in the captured frames information representing one or more moving targets;
remove the identified information from the captured frames prior to digitally transforming the captured frames; and
add the information to the compensated digitally transformed frames.

9. The system of claim 1, wherein the imaging sensor comprises a focal plane array sensor configured to point at a constant point on Earth.

10. The system of claim 1, wherein the digital transformations comprise homography functions based on a known trajectory of the movable imaging platform and a known imaging sensor pointing angle relative to the scene being imaged.

11. The system of claim 1, wherein the digital transformations comprise a set of eigenfunctions scaled by coefficients computed based on a known trajectory of the moveable imaging platform and a known imaging sensor pointing angle relative to the scene being imaged.

12. A method of pointing error corrected imaging, comprising:
receiving by one or more processors frames captured of a scene with an imaging sensor on a moving imaging platform, each frame comprising a plurality of pixels;
digitally transforming, by the one or more processors, the captured frames with respect to a common field of view (FOV), the one or more transformations compensating for the apparent motion in the scene induced by relative motion between the scene and the movable imaging platform, such that the pixel size and orientation of pixels of the digitally transformed frames are the same;
calculating, with the one or more processors, any motion residuals, comprising any apparent motion, remaining in the digitally transformed frames based on interframe scene gradients between the digitally transformed frames;
if any motion residuals remain in the digitally transformed frames,
fitting, by the one or more processors, a set of image eigenfunctions to the calculated motion residuals to compute residual transformation coefficients representing a pointing error of the imaging sensor,
applying, by the one or more processors, the set of image eigenfunctions scaled by the residual transformation coefficients to the digitally transformed frames to compensate for the pointing error, and
outputting, by the one or more processors, the compensated digitally transformed frames.

13. The method of claim 12, further comprising:
comparing, by the one or more processors, the computed residual transformation coefficients to residual transformation coefficients previously computed and stored in a database of motion residuals in order to determine one or more causes of the pointing error; and
updating, by the one or more processors, the database with the computed residual transformation coefficients.

14. The method of claim 13, further comprising populating, by the one or more processors, the database with residual transformation coefficients based on a known or expected relative motion of the platform to the scene and a known or expected pointing angle.

15. The method of claim 12, further comprising correcting, by the one or more processors, future image acquisition based on the computed residual transformation coefficients.

16. The method of claim 12, wherein the set of image eigenfunctions consists of linear translations.

17. The method of claim 12, further comprising:
determining, by the one or more processors, whether the calculated motion residuals are greater than a threshold value; and
if the calculated motion residuals are greater than the threshold value, selecting the set of eigenfunctions to include linear translation, rotation, scale, anamorphic stretch, skew and jitter.

18. The method of claim 12, further comprising:
identifying, by the one or more processors, in the captured frames information representing one or more moving targets;
removing, by the one or more processors, the identified information from the captured frames prior to digitally transforming the captured frames; and
adding, by the one or more processors, the information to the compensated digitally transformed frames.

19. The method of claim 12, wherein the digital transformations comprise a set of eigenfunctions scaled by coefficients computed based on a known trajectory of the moveable imaging platform and a known imaging sensor pointing angle relative to the scene being imaged.

20. A non-transient computer readable medium comprising program instructions, the program instructions when executed by one or more processors comprise instructions for:
receiving by one or more processors frames captured of a scene with an imaging sensor on a moving imaging platform, each frame comprising a plurality of pixels;
digitally transforming, by the one or more processors, the captured frames with respect to a common field of view (FOV), the one or more transformations compensating for the apparent motion in the scene induced by relative motion between the scene and the movable imaging platform, such that the pixel size and orientation of pixels of the digitally transformed frames are the same;
calculating, with the one or more processors, any motion residuals, comprising any apparent motion, remaining in the digitally transformed frames based on interframe scene gradients between the digitally transformed frames;
if any motion residuals remain in the digitally transformed frames, fitting, by the one or more processors, a set of image eigenfunctions to the calculated motion residuals to compute residual transformation coefficients representing a pointing error of the imaging sensor, applying, by the one or more processors, the set of image eigenfunctions scaled by the residual transformation coefficients to the digitally transformed frames to compensate for the pointing error, and outputting, by the one or more processors, the compensated digitally transformed frames.

* * * * *